United States Patent
Abe et al.

(10) Patent No.: US 8,810,951 B2
(45) Date of Patent: Aug. 19, 2014

(54) APPARATUS AND METHOD FOR CONTROLLING DATA WRITING TO A TAPE MEDIUM

(75) Inventors: Atsushi Abe, Yamato (JP); Takashi Katagiri, Yamato (JP); Hironobu Nagura, Yamato (JP); Hirokazu Nakayama, Yamato (JP); Yutaka Oishi, Yamato (JP); Katsumi Yoshimura, Yamato (JP)

(73) Assignee: International Business Machines Corporation, Armonk, NY (US)

( * ) Notice: Subject to any disclaimer, the term of this patent is extended or adjusted under 35 U.S.C. 154(b) by 27 days.

(21) Appl. No.: 13/509,605

(22) PCT Filed: Aug. 2, 2010

(86) PCT No.: PCT/JP2010/062998
§ 371 (c)(1),
(2), (4) Date: May 12, 2012

(87) PCT Pub. No.: WO2011/058794
PCT Pub. Date: May 19, 2011

(65) Prior Publication Data
US 2012/0293887 A1    Nov. 22, 2012

(30) Foreign Application Priority Data
Nov. 13, 2009  (JP) ................................. 2009-260042

(51) Int. Cl.
*G11B 15/46* (2006.01)
*G11B 5/09* (2006.01)
*G06F 13/00* (2006.01)

(52) U.S. Cl.
USPC ........................... 360/73.04; 360/50; 711/111

(58) Field of Classification Search
None
See application file for complete search history.

(56) References Cited

U.S. PATENT DOCUMENTS

| | | | |
|---|---|---|---|
| 4,176,380 A * | 11/1979 | Koski et al. | ..................... 360/50 |
| 5,525,790 A | 6/1996 | Koizumi et al. | |
| 6,307,701 B1 | 10/2001 | Beavers et al. | |
| 6,856,479 B2 | 2/2005 | Jaquette et al. | |
| 6,865,043 B2 | 3/2005 | Ataku et al. | |
| 6,950,257 B1 | 9/2005 | Greco et al. | |
| 6,958,878 B2 | 10/2005 | Jaquette et al. | |
| 6,970,311 B2 | 11/2005 | Jaquette | |
| 7,107,397 B2 | 9/2006 | Dahman et al. | |

(Continued)

FOREIGN PATENT DOCUMENTS

| | | |
|---|---|---|
| JP | 62049434 A | 3/1987 |
| JP | H02201628 A | 8/1990 |

(Continued)

*Primary Examiner* — K. Wong
(74) *Attorney, Agent, or Firm* — Griffiths & Seaton PLLC

(57) ABSTRACT

Data of a target capacity calculated by a nominal capacity of a tape medium minus a data capacity lost due to execution of backhitchless writing is written to the tape medium. In a tape drive, a command processing unit 41 receives a synchronization command, and a buffer management unit passes data in a buffer to a channel input-output unit. Upon completion of writing the data to the tape, a backhitch determination unit determines whether a mode information storage unit stores information indicating that a high data rate mode is on, whether data of a target capacity can be written to the tape, and whether the written data can be read at a target read data rate. An operation signal output unit issues a command to execute backhitch in case these conditions are not satisfied.

20 Claims, 9 Drawing Sheets

(56) References Cited

U.S. PATENT DOCUMENTS

| | | |
|---|---|---|
| 7,119,974 B2 | 10/2006 | Jaquette |
| 7,218,468 B2 | 5/2007 | Jauette et al. |
| 7,236,322 B2 | 6/2007 | Greco et al. |
| 7,350,021 B2 | 3/2008 | Itagaki et al. |
| 7,511,915 B2 | 3/2009 | Greco et al. |
| 7,535,664 B1 | 5/2009 | Gill |
| 7,631,141 B2 | 12/2009 | Watanabe |
| 7,903,363 B2 | 3/2011 | Itagaki et al. |
| 8,035,912 B2 * | 10/2011 | Katagiri et al. ............ 360/73.08 |

FOREIGN PATENT DOCUMENTS

| | | |
|---|---|---|
| JP | 6202814 A | 7/1994 |
| JP | 11239318 A | 8/1999 |
| JP | 2002528835 A | 9/2002 |
| JP | 2004-341925 | 12/2004 |
| JP | 2006-318571 | 11/2006 |
| JP | 2008-533636 | 8/2008 |
| WO | 0023992 A2 | 4/2000 |

* cited by examiner

| READ DATA RATE | TAPE SPEED |
|---|---|
| 140MB/sec | Speed1 |
| 120MB/sec | Speed2 |
| 100MB/sec | Speed3 |
| 80MB/sec | Speed4 |
| 60MB/sec | Speed5 |

FIG. 9

APPARATUS AND METHOD FOR CONTROLLING DATA WRITING TO A TAPE MEDIUM

CROSS-REFERENCE TO RELATED APPLICATIONS

This application is based upon and claims priority from prior International (PCT) Application No. PCT/JP2010/062998 filed on Aug. 2, 2010, and Japanese Patent Application No. 2009-260042 filed on Nov. 13, 2009, the entire disclosures of which are herein incorporated by reference in their entirety.

BACKGROUND

The invention relates to an apparatus and method for controlling data writing. In particular, the invention relates to an apparatus and method for controlling data writing to a tape medium.

A drive to write data to magnetic tapes such as with LTO (Linear Tape Open) format receives synchronization commands from a host (an application program) periodically during a writing. The synchronization command is a command to force write data accumulated in a tape drive buffer to a tape medium. The application periodically sends the synchronize command to assure that all data sent to the tape drive has been written to the tape medium and does not remain in the buffer of the tape drive.

When the tape drive receives a synchronization command, the tape drive buffer becomes empty. Then, the tape drive usually performs a "backhitch." A backhitch is a series of operations including stopping the transport of the tape medium once, rewinding the tape medium in a reversed direction, thereafter transporting the tape medium again in the original direction to the target position to restart writing the next data.

A backhitch requires approximately two or three seconds. Since the writing of next data starts after completion of this backhitch, frequent synchronization commands cause considerable degradation in write performance.

There have been proposed techniques of writing without execution of backhitch.

Japanese Patent Application Publication No. 2006-318571 describes an apparatus including a host I/F unit to store a dataset sent from a host into a buffer memory, as well as to send the dataset to the host, and a medium I/F unit to take out a dataset stored in the buffer memory and to transfer the dataset to a tape, as well as to store a dataset read from a tape into the buffer memory. The apparatus acquires a data rate with the host from the host I/F unit, acquires an error rate in writing to the tape from the medium I/F, determines a tape speed based on the data rate and the error rate, and performs control to transport the tape with the determined speed.

Japanese Patent Application Publication No. 2004-341925 describes a storage apparatus to sequentially write multiple sets of write data to a data recording medium in segment units of a predetermined size. For each of sets of write data, the storage apparatus writes the set of write data to at least one segment of the data recording medium when the set of write data is received in association with a write command to write the set of write data to the data recording medium. In the case where the size of one set of write data is smaller than a prescribed size that is determined in advance, the storage apparatus concatenates the one set of write data and multiple sets of write data written after the one set of write data, among the multiple sets of write data sequentially written to the data recording medium, and then writes the concatenated sets of write data to a smaller number of segments than the number of segments originally required to write the sets of write data targeted for the concatenation. In addition, the storage apparatus performs backhitchless flush of writing write data to a tape recording medium without executing backhitch, and thereby operates with a higher speed than in the case of executing the backhitch.

PCT International Application No. 2008-533636 discloses a helical scan tape recorder including a rotatable scanner, and a transport system for transporting a magnetic tape to a position proximate to the rotatable scanner in a manner so that information can be recorded during a revolution of the scanner. In the helical scan tape recorder, a controller performs, as a pause routine for pausing during a recording operation on the tape, the steps of: determining a tape pause position reference value indicative of a pre-pause last recording position on the tape; recording an erase signal on the tape after the pre-pause last recording position; rewinding the tape; transporting the tape in a forward direction and obtaining a current tape position value; determining when the current tape position value reaches a predetermined value relative to the tape pause position reference value; and at beginning of a next revolution of the scanner, commencing recording of one or more post-pause stripes on the tape.

SUMMARY

The invention provides an apparatus of controlling writing of data to a tape medium. The apparatus includes a storage unit that stores mode information indicating a mode of the apparatus; and a determination unit that determines to write a target capacity of data to the tape medium when the mode information stored in the storage unit indicates a particular mode, the target capacity calculated by a nominal capacity of the tape medium minus a data capacity lost due to execution of backhitchless writing.

The determination unit may determine not to execute backhitch after writing first data to the tape medium until writing second data next to the first data to the tape medium, under one condition that the target capacity of data is expected to be written to the tape medium The determination unit may determine not to execute backhitch after writing the first data to the tape medium until writing the second data to the tape medium, under one condition that a read data rate from the tape medium is expected to satisfy a target read rate.

In this case, the determination unit may determine that the read data rate from the tape medium will satisfy the target read rate when the sum of a time required to read unit data written to the tape medium with a maximum speed achievable by the apparatus and a time required to skip an area on the tape medium where no data is written because the tape medium is transported without execution of backhitch is shorter than a time required to read the unit data at the target read rate.

Instead, the determination unit may determine that the read data rate from the tape medium will satisfy the target read rate when a time required to read unit data written to the tape medium and an amount of data corresponding to an area on the tape medium where no data is written because the tape medium is transported without execution of backhitch is shorter than a time required to read the unit data at the target read rate.

In addition, in response to loading of a tape cartridge containing the tape medium, the storage unit may store the mode information indicating the particular mode according to an instruction from an application program configured to write data to the medium.

Instead, in response to loading of a particular tape cartridge containing the tape medium, the storage unit may store the mode information indicating the particular mode.

The invention also provides an apparatus of controlling data writing to a tape medium. The apparatus includes a storage unit that stores mode information indicating a mode of the apparatus; and a determination unit that determines to write a target capacity of data to the tape medium, without executing backhitch after writing first data to the tape medium until writing second data next to the first data to the tape medium in a case where the mode information stored in the storage unit indicates a particular mode, where the target capacity of data is expected to be written to the tape medium, and where a read data rate from the tape medium is expected to satisfy a target read rate, the target capacity calculated by a nominal capacity of the tape medium minus a data capacity lost due to execution of backhitchless writing.

Still further, the invention provides a computer implemented method of controlling the writing of data to a tape medium. The method includes storing mode information indicating a mode of the apparatus in a memory; and determining to write a target capacity of data to the tape medium when the mode information stored in the memory indicates a particular mode. The target capacity is calculated by a nominal capacity of the tape medium minus a data capacity lost due to execution of backhitchless writing.

The invention also provides a computer program product that causes a computer to function as an apparatus of controlling writing of data to a tape medium. The program product causes the apparatus to store mode information indicating a mode of the apparatus in a memory; and to determine to write a target capacity of data to the tape medium when the mode information stored in the memory indicates a particular mode. The target capacity is calculated based on a nominal capacity of the tape medium minus a data capacity lost due to execution of backhitchless writing.

BRIEF DESCRIPTION OF THE DRAWINGS

FIG. 9 is a diagram showing correspondence between the read data rate and a tape speed.

DETAILED DESCRIPTION

Embodiments of the invention will be described in detail with reference to the accompanying drawings.

The invention enables writing a target capacity of data to a tape medium, where the target capacity is calculated based on a nominal capacity of the tape medium minus a data capacity lost due to execution of backhitchless writing.

In the case of resuming writing of a next dataset while transporting the tape medium without execution of backhitch, an interval occurs between the dataset lastly written in response to a synchronization command, and the subsequently written dataset, and the capacity is decreased because no data can be written to the portion of the interval. This capacity decrease, if occurs, causes a data capacity (nominal capacity), which is guaranteed as an amount of data writable to a tape medium, being not writable to the tape medium.

Figure 1:
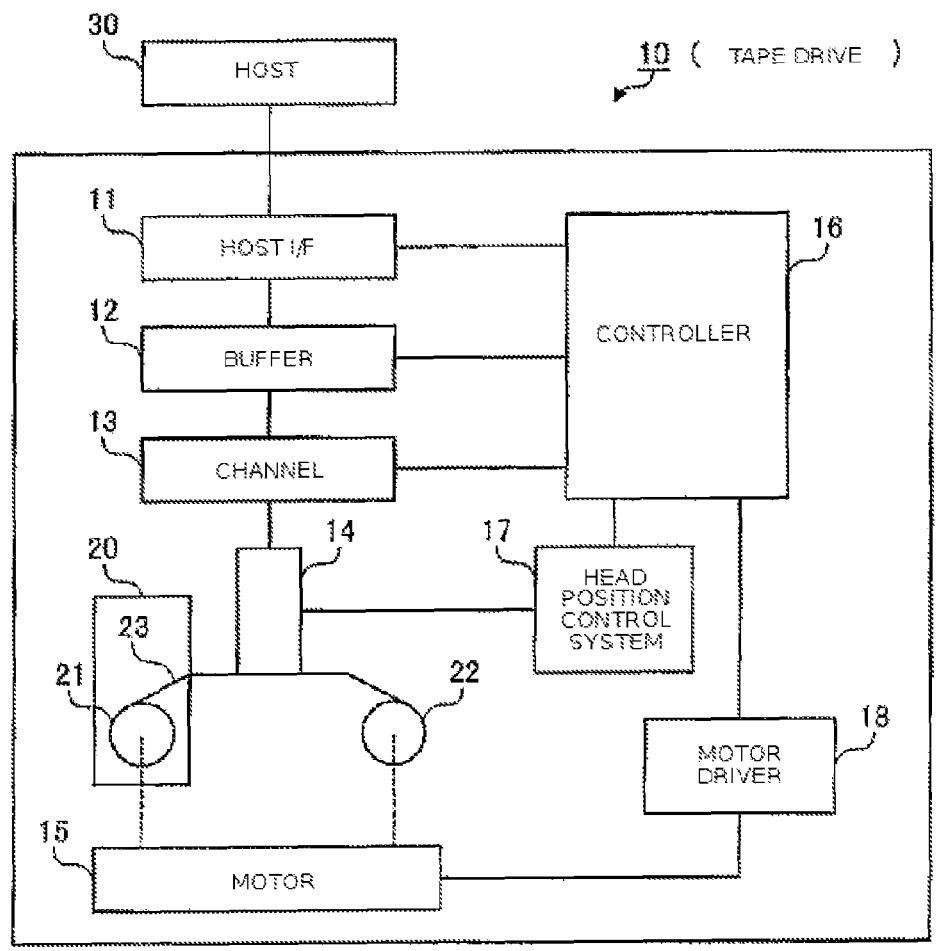
FIG. 1 is a block diagram illustrating a configuration of a tape drive to which an embodiment of the invention is applied.

FIG. 1 is a diagram illustrating a configuration example of a tape drive 10 to which an embodiment of the invention is applied. This tape drive 10 includes a host interface (hereinafter, referred to as "host I/F") 11, a buffer 12, a channel 13, a head 14, and a motor 15. In addition, the tape drive 10 includes a controller 16, a head position control system 17, and a motor driver 18. FIG. 1 also illustrates a tape cartridge 20. The tape cartridge 20 is loadable in the tape drive 10 by being inserted thereinto. This tape cartridge 20 includes a tape 23 wound around reels 21 and 22. With rotations of the reels 21 and 22, the tape 23 is transported in a longitudinal direction, i.e., in a direction from the reel 21 to the reel 22 or a direction from the reel 22 to the reel 21. Note that, a magnetic tape is illustrated as the tape 23, but any tape medium other than the magnetic tape is usable.

The host I/F 11 communicates with a host 23 that is an example of an upper level apparatus from the tape drive 10. For example, the host I/F 11 receives a command to write data to the tape 23, a command to read data from the tape 23, a command to transport the tape 23 to position a target location, and a command (a synchronization command) to forcedly write data stored in the buffer 12 to the tape 23. Here, SCSI is illustrated as a communication protocol standard used by the host I/F 11. In the case of SCSI, the first command corresponds to a Write command, the second command corresponds to a Locate command or a Space command, the third command corresponds to a Read command, and the fourth command corresponds to a WriteFM non-immediate command. In addition, the host I/F 11 returns to the host 30 a reply indicating a success or failure of processing in response to any of these commands.

The buffer 12 is a memory in which data to be written to the tape 23 and data read from the tape 23 are accumulated. For example, the buffer 12 is formed of a DRAM (Dynamic Random Access Memory). In addition, the buffer 12 includes multiple buffer segments, and each of the buffer segments stores a dataset that is a unit of data to be written to and read from the tape 23. The channel 13 is a data path to send data from the head 14 to the tape 23, and to receive data read from the tape 23 to the head 14.

The head 14 writes data to the tape 23 or reads data from the tape 23 while the tape 23 is moving in the longitudinal direction.

The motor 15 rotates the reels 21 and 22. Although FIG. 1 illustrates one rectangle for the motor 15, it is preferable to provide two motors 15 in total for the reels 21 and 22, respectively, on a one-to-one basis.

The controller 16 controls the whole of the tape drive 10. For example, the controller 16 controls data write to the tape medium and data read from the tape 23 in accordance with commands received by the host I/F 11. In addition, the controller 16 controls the head position control system 17 and the motor driver 18.

The head position control system 17 is a system to track desired one or more wraps. Here, the term wrap means a group of tracks on the tape 23. When the wrap needs to be switched to another one, the head 14 also needs to be switched electrically. Thus, the head position control system 17 controls such a switching operation.

The motor driver 18 drives the motor 15. If the two motors 15 are used as described above, two motor drivers 18 are provided as well.

In an embodiment of the invention, even when receiving a synchronization command, the tape drive 10 having the above configuration continuously transports the tape 23 without executing backhitch, and writes next data to the same wrap. This method of writing data to the same wrap without executing backhitch is referred to as SWBF (Same Wrap Backhitchless Flush) or Skip Sync, and is called SWBF in the following description.

For this method, an embodiment of the invention prepares "a high data rate mode" (one example of a specific mode) supposed to write a target capacity that is smaller than a nominal capacity, instead of aiming to write the nominal capacity. Here, the target capacity means a capacity obtained by subtracting a preset margin for SWBF. In a tape cartridge 20 having a nominal capacity of 1.5 TB, for example, the target capacity is 1.0 TB if the margin of the tape 23 is set to 0.5 TB. In this case, the high data rate mode aims to write 1.0 TB or more of data.

Implementation of this high data rate mode requires the following technical mechanisms. The first mechanism is capacity control. In this control, whether or not to execute backhitch is determined in order to write data of the preset target capacity or more.

The second mechanism is control for a read data rate. In this control, whether or not to execute backhitch is determined in consideration of the read data rate.

The third mechanism is control for the high data rate mode. In this control, a timing when the tape drive 10 is switched to the high data rate mode is determined.

Capacity Control

The tape drive 10 has a predetermined target capacity of the tape cartridge 20 in addition to the nominal capacity thereof.

Then, upon receipt of a synchronization command, the tape drive 10 judges whether the following formula 1 holds (is TRUE) or does not hold (is FALSE).

If it is judged as TRUE as a result, the tape drive 10 determines that there is a margin large enough to write the target capacity of data to the tape 23, and waits for transmission of next data from the host 31 without executing backhitch. Then, if next data is prepared within a specified time, the tape drive 10 resumes writing data. If the next data is not ready within the specified time, the tape drive 10 executes backhitch, and when the next data is prepared, writes the next data to the tape 23 at a location immediately after the data lastly written.

On the other hand, if it is judged as FALSE, the tape drive 10 executes backhitch as usual, and waits for transmission of next data from the host 30.

By judging to execute backhitch by use of the following formula 1, the data derive 10 can aim to write the target capacity of data or more to the tape 23, and can reduce the occurrence frequency of backhitch executed in response to synchronization commands.

$$(C \times r - n) \times L < T - x \quad \text{(formula 1)}$$

The variables are defined as follows.

"C" denotes the total number of datasets for the case of a nominal capacity of 1.5 TB. When the dataset size is 2.4 MB, for example, C=1.5 TB/2.4 MB=625000. T denotes an effective tape length and is a value calculated by the total tape length minus a length of an end warning area. Here, the end warning area is located near an end of the tape 23, and is an area for returning a warning called "Early Warning" to the host 30 so that all the data stored in the buffer 12 can be written to the tape 23 before the end thereof.

"r" denotes an SWBF margin ratio, and is a value obtained by dividing the length of the margin for SWBF by T. When the target capacity is 1.0 TB and the nominal capacity is 1.5 TB, for example, r=2/3.

"x" denotes a final dataset location, that is, a physical location of a dataset lastly written (0<x<T).

"n" denotes a final dataset number, that is the number of the dataset lastly written.

"L" denotes a dataset length. Here, a dataset is rewritten if a writing error occurs. L is a dataset length without consideration of such rewriting of the dataset.

Control for Read Data Rate

Frequent execution of SWBF may significantly decrease a data rate in reading datasets from the tape 23 due to widening of intervals between the datasets written to the tape 23. Here, consider the case where synchronization commands are received in units of 24 MB, and where SWBF is executed for each synchronization command if the formula 1 is true, for example. In this case, if one dataset is of 2.4 MB, 10 datasets are collectively written to the tape 23, then SWBF is executed, and then a next dataset is written with a dataset interval spaced out. Here, the dataset interval between the 10 datasets collectively written is very short, but the dataset interval spaced out when SWBF is executed is very long (for example, 3 m).

In general, the maximum data rate in reading described in the specifications of the tape drive 10 is determined by a line density/a maximum tape speed. The line density is a dataset size/a dataset length, and is determined without consideration of the dataset interval on the tape 23 generated by SWBF. If the maximum tape speed is 5.987 m/sec for the tape drive 10 capable of usually reading with 140 MB/sec, the read data rate in the above case is 35 MB/sec as a result of calculations as described below:

SWBF overhead=3 [m]/5.987 [m/sec]=0.501 [sec]

read time of 10 datasets=10×2.4 [MB]/140 [MB/sec]=0.171 [sec]; and average read time=data amount of read target data/ (SWBF overhead+read time of 10 datasets)=10× 2.4 [MB]/(0.501 [sec]+0.171 [sec])=35 [MB/ sec].

Users may be concerned about a significant degradation of read performance, no matter how write performance is increased.

For this reason, an embodiment of the invention judges to execute SWBF in data writing, in consideration of a tolerable level of degradation in the read performance. Such control methods for the read data rate are roughly classified into two control methods.

The first method is an interval-based control method. The distance between datasets can be controlled by control of an interval that is a wait time for preparation of next data. In this way, the number of datasets within a certain length can be controlled and thereby the read data rate can be controlled.

Specifically, a threshold derived by using the following formula 2 is controlled to control the read data rate. In the tape drive 10 followed by LTO format, the maximum dataset distance is 4 m. If the read data rate is not taken into consideration, the tape drive 10 may continue to wait for preparation of next data until 4 m of the tape passes after the above formula 1 is judged as TRUE. However, the tape drive 10 controls the read data rate by controlling the wait time for the preparation of the next data to control by use of the following formula. To be more specific, the tape drive 10 executes SWBF if Threshold in the formula 2 is larger than 0, and does not execute SWBF if Threshold is equal to or smaller than 0.

$$\text{Threshold} = \text{Target\_Data\_Size}/\text{Target\_Read\_Data\_Rate} - \text{Target\_Data\_Size}/\text{Read\_Data\_Rate\_with\_Speed1} - \text{Accumulated\_Interval} * \text{Speed\_X}/\text{Speed1}. \quad \text{(formula 2)}$$

The variables are defined as follows.

Target_Data_Size denotes a size of unit data for performance measurement.

Target_Read_Data_Rate denotes a read data rate to be achieved.

Read_Data_Rate_with_Speed1 denotes a read data rate in the case where the tape 23 is transported with the maximum speed. In other words, the tape drive 10 is supposed to provide higher Read_Data_Rate_with_Speed1 than Target_Read_Data_Rate per unit data.

Accumulated_Interval denotes a time generated by SWBF during writing of data of Target_Data_Size, and specifically denotes a cumulative total of times, each generated after completion of writing in response to a synchronization command until start of writing next data, during the writing of the data of Target_Data_Size.

Speed_X denotes a tape speed in writing during the execution of SWBF. Since Accumulated_Interval is a time measured during data writing, a time required for skip reading with speed1 is obtained by converting Accumulated_Interval by use of Speed_X of the tape speed at the above data writing.

For example, assume that Target_Data_Size:=100 MB, Target_Read_Data_Rate:=100 MB/sec, Read_Data_Rate_with_Speed1:=142 MB/sec, Speed_X:=Speed 1=5.987 m/sec, a transaction size (an amount of data written to the tape 23 in response to a single synchronization command) is 10 MB, and every interval between transactions (each transaction is data writing to the tape 23 in response to a single synchronization command) is 0.1 sec.

When 10 MB of data is written in response to a first synchronization command, Threshold is calculated as Threshold=100/100−100/142−0=0.29 sec. In this case, since Threshold is larger than 0, SWBF is executed.

Then, after 0.1 seconds, 10 MB of data is written in response to a second synchronization command. At this time, Threshold is calculated as Threshold=100/100−100/142−0.1=0.19 sec. Also in this case, Threshold is larger than 0 and SWBF is executed.

Then, when 10 MB of data is written in response to a third synchronization command after 0.1 seconds, Threshold is calculated as Threshold=100/100−100/142−0.2=0.09 sec. In this case, Threshold is larger than 0 and SWBF is executed as well.

Further, when 10 MB of data is written in response to a fourth synchronization command after 0.1 seconds, Threshold is calculated as Threshold=100/100−100/142−0.3=−0.91 sec. In this case, since Threshold is equal to or smaller than 0, SWBF is not executed.

In other words, when a time after the execution of SWBF until the completion of preparation of next data is short constantly, SWBF is executed because the read data rate is not influenced much even though synchronization commands are frequently received.

However, if a time after the execution of SWBF until the completion of preparation of next data is long, the wait time for preparation of next data is made short in the next execution of SWBF. In this way, the target value of the read data rate is controlled.

This interval-based control method will be described with reference to the following drawing.

Figure 2:
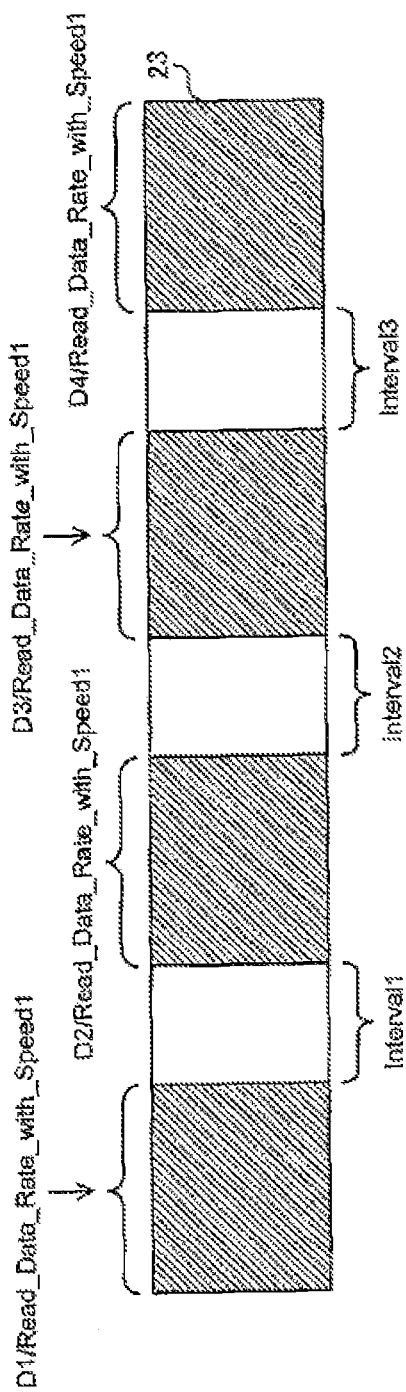
FIG. 2 is a diagram showing an interval-based control as a kind of control for a read data rate according to an embodiment of the invention.

FIG. 2 is a diagram illustrating a portion of the tape 23 to which the unit data for performance measurement is written.

In the drawing, four areas where datasets are written are illustrated by diagonal hatching. The data sizes written to the respective areas are called D1, D2, D3, and D4, respectively, from the left side. In other words, Target_Data_Size=D1+D2+D3+D4. Then, a time required to read these datasets at the read data rate Read_Date_Rate_with_Speed1 that is the maximum speed achievable by the tape drive 10 is $$D1/\text{Read\_Data\_Rate\_with\_Speed1} + D2/\text{Read\_Data\_Rate\_with\_Speed1} +$$
$$D3/\text{Read\_Data\_Rate\_with\_Speed1} +$$
$$D4/\text{Read\_Data\_Rate\_with\_Speed1}.$$

In addition, three areas where no data is written due to execution of SWBF are present between these datasets. Times required to skip these areas with the maximum tape speed achievable by the tape drive 10 (the tape speed corresponding to the maximum read data rate) are called Interval1, Interval2 and Interval3, respectively. In other words, Accumulated_Interval*Speed_X/Speed1=Interval1+Interval2+Interval3.

In the above case, by reading data with the maximum tape speed, the datasets can be read for a time specified by Target_Data_Size/Read_Data_Rate_with_Speed1+Accumulated_Interval*Speed_X/Speed1. Therefore, if this time is shorter than Target_Data_Size/Target_Read_Data_Rate, it can be concluded that the unit data can be read at the target read data rate.

The second method is a transaction-size-based control method. In this control, SWBF is not executed if a transaction size is small or if the size of accumulated data is small. In this way, the number of datasets within a certain length can be controlled and thereby the read data rate can be controlled.

Specifically, Threshold derived from the following formula 3 is controlled to control the read data rate. To be more specific, the tape drive 10 executes SWBF if Threshold in the formula 3 is larger than 0, and does not execute SWBF if Threshold is equal to or smaller than 0.

$$\text{Threshold} = \text{Tx\_Size}/\text{Target\_Read\_Data\_Rate} - (\text{Tx\_Size} + X)/\text{Read\_Data\_Rate\_with\_Speed1} \quad \text{(Formula 3)}$$

The variables are defined as follows.

Tx_Size denotes a transaction size, that is, an amount of data written to the tape 23 in response to a single synchronization command as described above.

Target_Read_Data_Rate denotes a read data rate to be achieved.

X denotes an amount of data readable from a maximum idle transport length after SWBF, and is X=Read_Data_Rate_with_Speed1*Max_Interval/Tape_Speed. Here, Max_Interval is the maximum idle transport length after SWBF, and is 4 m for the tape drive 10 in conformity with LTO. In addition, Tape_Speed denotes a current speed of tape 23.

Read_Data_Rate_with_Speed1 denotes a read data rate in the case where the tape 23 is transported with the maximum speed.

For example, assume that Target_Read_Data_Rate:=100, Read_Data_Rate_with_Speed1:=142 MB/sec, Max_Interval:=4 m, and Tape_Speed:=5.987 m/sec.

If the transaction size is 230 MB, Threshold is calculated as Threshold=230/100−(230+142*4/5.987)/142=0.012 sec. In this case, since Threshold is larger than 0, SWBF is executed.

If the transaction size is 220 MB, Threshold is calculated as Threshold=220/100−(220+142*4/5.987)/142=−0.017 sec. In this case, since Threshold is equal to or smaller than 0, SWBF is not executed.

This transaction-size-based control method will be described with reference to the following drawing.

Figure 3:
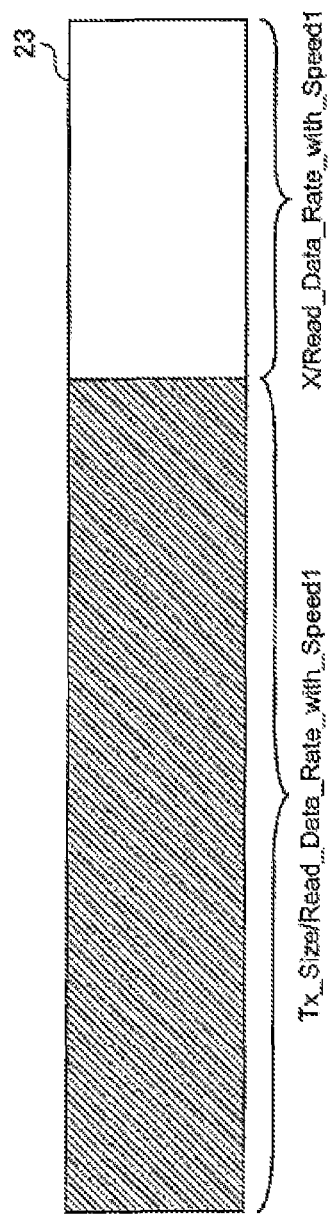
FIG. 3 is a diagram showing a transaction-size-based control as a kind of control for the read data rate according to an embodiment of the invention.

FIG. 3 is a diagram illustrating a portion of the tape 23 including an area to which data for one transaction is written and an area to which no data is written due to execution of SWBF.

In the drawing, the area to which data is written is shown by diagonal hatching. The data size written to this area, that is, the transaction size is called Tx_Size. Then, a time required to read this data at the maximum read data rate Read_Data_Rate_with_Speed1 achievable by the tape drive 10 is Tx_Size/Read_Data_Rate_with_Speed1. In addition, the data size writable to the area to which no data is written due to execution of SWBF is called X. Then, a time required to read this data at the maximum read data rate Read_Data_Rate_with_Speed1 achievable by the tape drive 10, that is, a time required to skip this area is X/Read_Data_Rate_with_Speed1.

In the above case, by data reading with the maximum tape speed, the data for one transaction (that is interpretable as unit data) can be read for a time specified by (Tx_Size+X)/Read_Data_Rate_with_Speed1. Therefore, if this time is shorter than Tx_Size/Target_Read_Data_Rate, it can be concluded that data for one transaction can be read at the target read data rate.

Control for High Data Rate Mode

In order to prepare the high data rate mode for the tape drive 10, a consideration needs to be taken as to a timing of setting the tape drive 10 to the high data rate mode.

The followings methods are possible methods of setting the tape drive 10 to the high data rate mode.

In the first method, the tape drive 10 is set to the high data rate mode every time an application program loads the tape cartridge 20. Specifically, in response to loading of the tape cartridge 20, the tape drive 10 is set to the high data rate mode according to an instruction from the application program configured to write data to the tape 23.

In the second method, the tape drive 10 records, in an internal non-volatile memory, that the tape drive 10 is set in the high data rate mode, and operates in the high data rate mode in a manner transparent to the application program. In this case, the recording that the tape drive 10 is set in the high data rate mode in the non-volatile memory may be performed prior to shipment of the tape drive 10, or may be performed by using a tool or the like at any timing after the shipment of the tape drive 10.

In the third method, when a particular tape cartridge 20 is loaded, the tape drive 10 is set to the high data rate mode.

Next, description will be provided for a functional configuration of the controller 16 to implement these operations.

Figure 4:
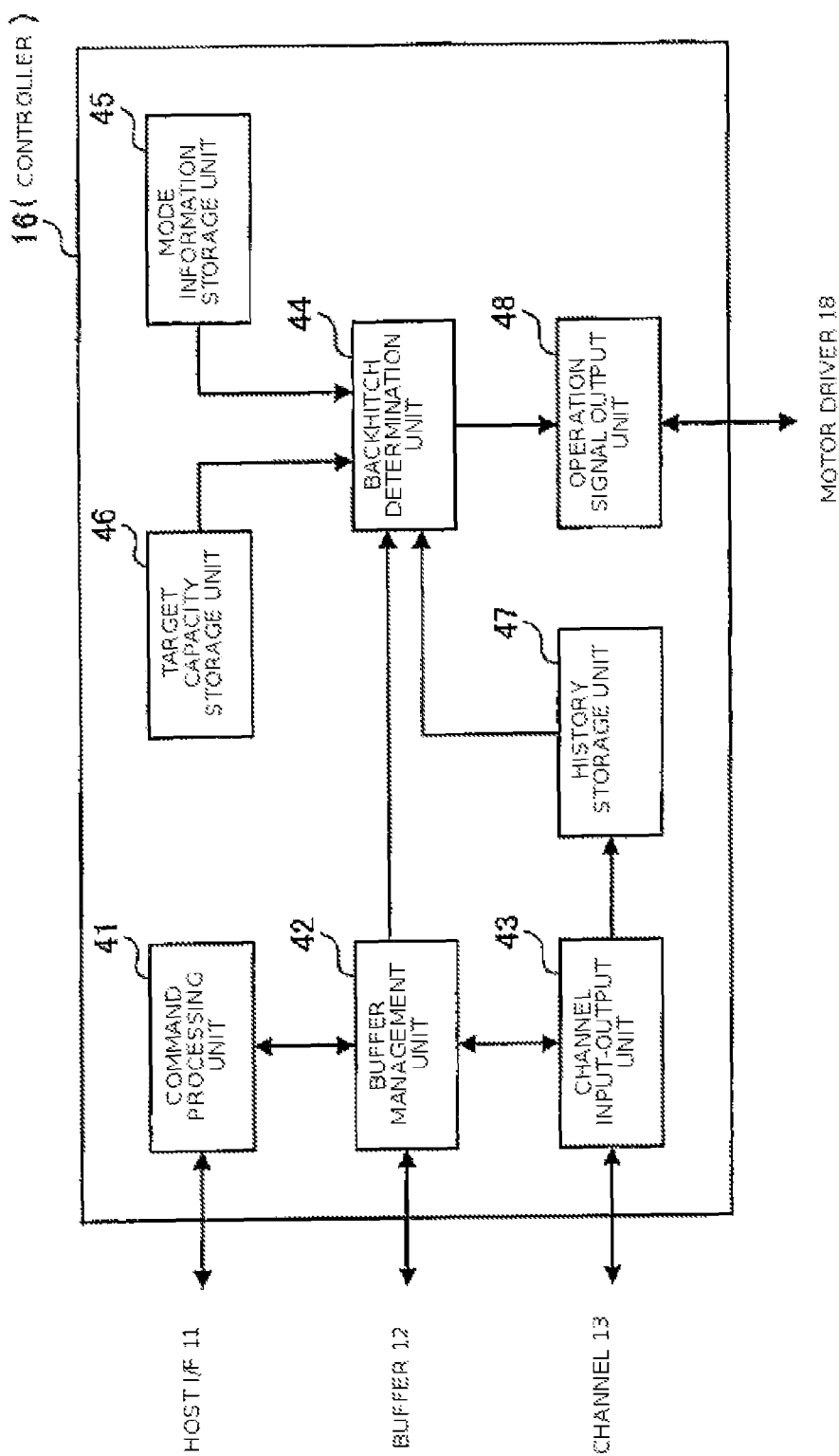
FIG. 4 is a block diagram showing a functional configuration example of a controller according to an embodiment of the invention.

FIG. 4 is a block diagram illustrating a functional configuration example of the controller 16.

As illustrated in the drawing, the controller 16 includes a command processing unit 41, a buffer management unit 42, a channel input-output unit 43, a backhitch determination unit 44, a mode information storage unit 45, a target capacity storage unit 46, a history storage unit 47 and an operation signal output unit 48.

The command processing unit 41 receives commands from the host I/F 11. The commands mentioned herein include, for example, a Write command to store data into the buffer 12, and a synchronization command (a WriteFM command or the like) to write data stored in the buffer 12 to the tape 23.

The buffer management unit 42 prepares data in the buffer 12 in the case where the command processing unit 41 receives a Write command. In addition, in the case where the command processing unit 41 receives a synchronization command, the buffer management unit 42 reads data from the buffer 12, and outputs the data to the channel input-output unit 43. The channel input-output unit 43 outputs data read from the buffer 12 by the buffer management unit 42 to the channel 13 or stores data received from the channel 13 into the buffer 12.

The backhitch determination unit 44 determines whether or not to execute backhitch in order to write the target capacity to the tape 23 and to ensure the target read data rate. In the present embodiment, the backhitch determination unit 44 is provided as an example of a determination unit to determine to write a target capacity of data to a tape medium and determine not to execute backhitch.

The mode information storage unit 45 stores mode information indicating whether or not the tape drive 10 is currently set to the high data rate mode. In the present embodiment, the mode information storage unit 45 is provided as an example of a storage unit to store mode information. The target capacity storage unit 46 stores information of the target capacity that should be written out of the nominal capacity of the tape 23.

The history storage unit 47 stores history information including information such as the size and position of each of datasets written to the tape 23 in the past and a distance between the datasets. Here, the history information may include information (for example, information on error occurrence) other than the above kinds.

The operation signal output unit 48 outputs to the motor driver 18 a signal instructing the motor driver 18 to perform an operation determined by the backhitch determination unit 44.

Next, operations of the controller 16 will be described.

Figure 5:
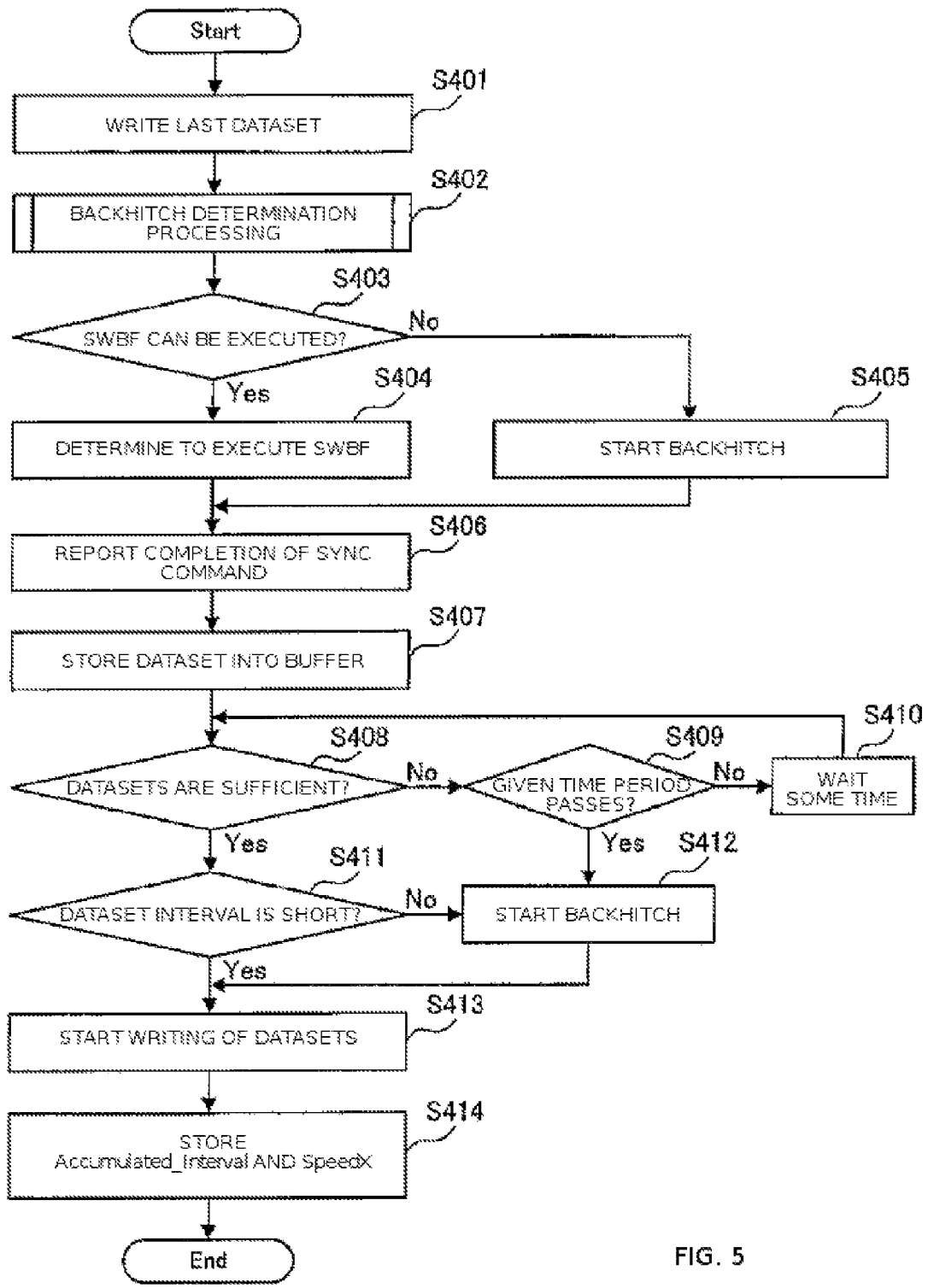
FIG. 5 is a diagram showing a first operation example of the controller according to an embodiment of the invention.

FIG. 5 is a flowchart illustrating a first operation example of the controller 16. This first operation example corresponds to the interval-based control method in the control for the read data rate. Here, this operation example is assumed to start during writing of datasets in the buffer 12 to the tape 23 in response to a synchronization command.

In the controller 16 during such writing of the datasets, the buffer management unit 42 reads the last dataset from the buffer 12, and passes the data to the channel input-output unit 43, and the channel input-output unit 43 writes the passed dataset to the tape 23 (step 401).

At this time, since the buffer management unit 42 is informed that the last dataset is written to the tape 23, the buffer management unit 42 instructs the backhitch determination unit 44 to determine whether or not to execute backhitch. In response, the backhitch determination unit 44 performs backhitch determination processing of determining whether or not to execute backhitch from the standpoints of writing the target capacity to the tape 23 and ensuring the target read data rate (step 402). The details of the backhitch determination processing will be described below. The determination result in the backhitch determination processing is outputted to the operation signal output unit 48.

In response, the operation signal output unit 48 determines whether or not the determination result indicates that SWBF should be executed (backhitch should not be executed) (step 403).

Here, if the determination result indicates that SWBF should be executed, the operation signal output unit 48 determines to execute SWBF (step 404). In other words, the operation signal output unit 48 does not output a signal instructing a start of backhitch to the motor driver 18.

On the other hand, if the determination result does not indicate that SWBF should be executed, that is, if the determination result indicates that backhitch should be executed, the operation signal output unit 48 outputs a signal instructing a start of backhitch to the motor driver 18 (step 405).

Upon determination to execute SWBF or start of backhitch as described above, information on that effect is returned to the command processing unit 41, and the command processing unit 41 reports the completion of the synchronization command to the host 30 (step 406).

Thereafter, the command processing unit 41 receives the next dataset, and passes the dataset to the buffer management unit 42, and the buffer management unit 42 stores the received data to the buffer 12 (step 407).

Then, the buffer management unit 42 determines whether or not datasets sufficient to start new writing are already received (step 408). When it is determined that the sufficient datasets are not received yet, the buffer management unit 42 advances to determining whether or not a given time period passes after the completion of step 406 (step 409). When the given time period does not pass yet, the buffer management unit 42 waits for some time (step 410) and then again makes the determination in step 408. When the given time period passes, the buffer management unit 42 passes control to the operation signal output unit 48, and the operation signal output unit 48 outputs a signal instructing start of backhitch to the motor driver 18 (step 412). In contrast, when it is determined in step 408 that the sufficient datasets are received, the buffer management unit 42 determines whether or not the interval between the current location of the head 14 and the location of the end of the dataset lastly written is short (step 411). For example, the determination may be made on whether or not the interval is shorter than a threshold of the dataset interval.

Here, in the case where the given time period passes after the completion of step 406, and where the interval between the current location of the head 14 and the location of the end of the dataset lastly written is long after the reception of sufficient datasets, the buffer management unit 42 passes control to the operation signal output unit 48. Then, the operation signal output unit 48 outputs a signal instructing start of backhitch to the motor driver 18 (step 412). Then, the buffer management unit 42 reads the datasets from the buffer 12, and passes the datasets to the channel input-output unit 43, and the channel input-output unit 43 writes the datasets to the tape 23 (step 413).

On the other hand, if the interval between the current location of the head 14 and the location of the end of the dataset lastly written is short, backhitch is not executed, but the buffer management unit 42 reads the datasets from the buffer 12, and passes the datasets to the channel input-output unit 43, and the channel input-output unit 43 writes the datasets to the tape 23 (step 413).

Thereafter, the channel input-output unit 43 acquires Accumulated_Interval, which is a cumulative total of dataset intervals generated within a range where unit data (target data) closest to the current write location is written, and Speed_X of the tape speed at the above writing, and stores Accumulated_Interval and Speed_X into the history storage unit (step 414).

Next, the details of the backhitch determination processing in step 402 will be described.

Figure 6:
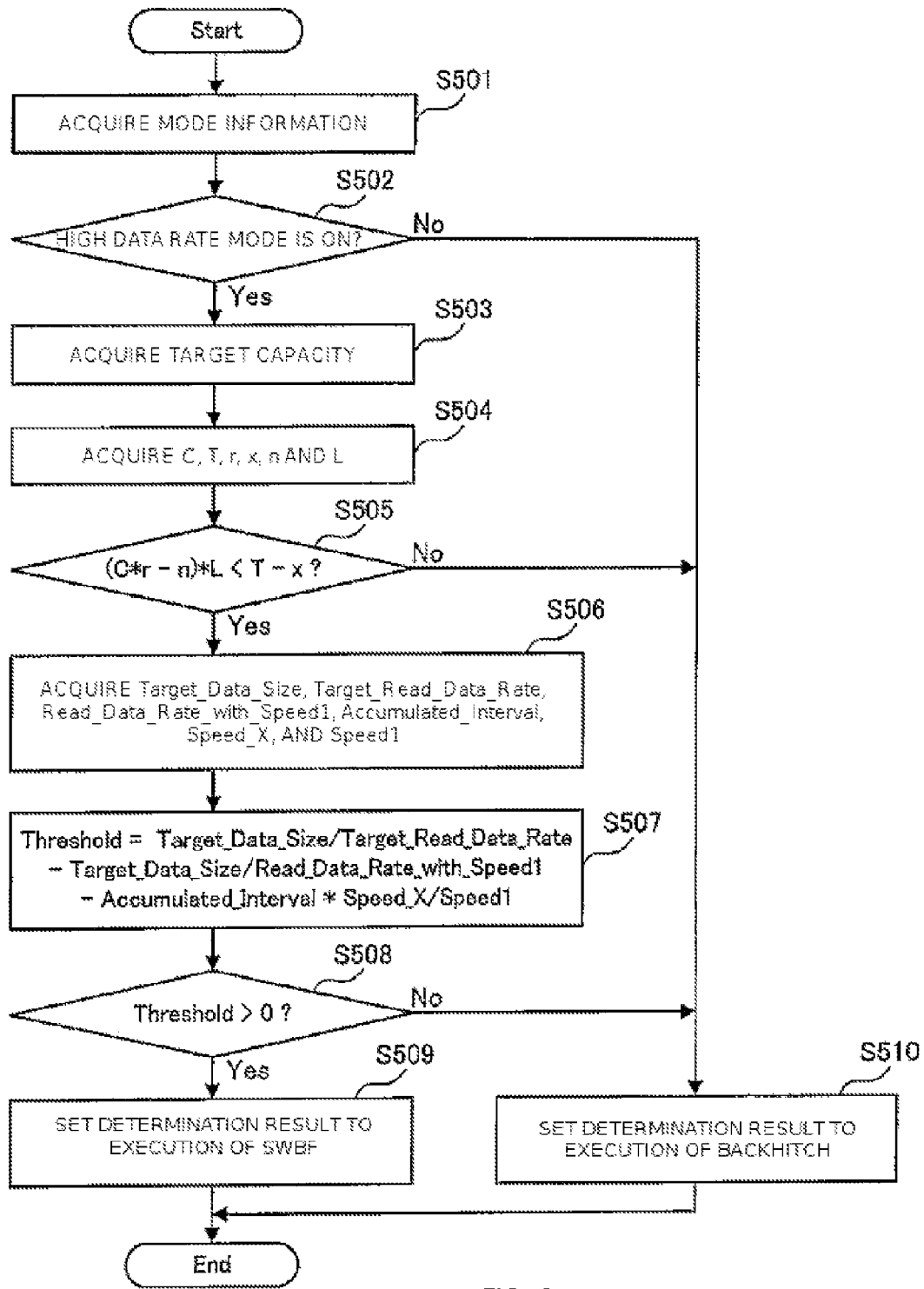
FIG. 6 is a diagram showing a first operation example of a backhitch determination unit of the controller according to an embodiment of the invention.

FIG. 6 is a flowchart illustrating a flow of the backhitch determination processing.

Firstly, the backhitch determination unit 44 acquires the mode information stored in the mode information storage unit 45 (step 501). Then, the backhitch determination unit 44 determines whether or not the mode information indicates the high data rate mode (step 502).

When the mode information is determined to indicate the high data rate mode as a result, the backhitch determination unit 44 acquires the target capacity from the target capacity storage unit 46 (step 503). Additionally, the backhitch determination unit 44 acquires a total number of datasets C, an effective tape length T, an SWBF margin ratio r, a last data size set location x, a last dataset number n, and a dataset length L (step 504). Among them, C, T and L may be acquired from setting information internally retained in advance. Moreover, r may be obtained by dividing the target capacity acquired in step 503 by the nominal capacity. Further, since x and n can be obtained when the last dataset is written in step 401, these values may be acquired as x and n.

Subsequently, the backhitch determination unit 44 determines whether or not the values thus acquired satisfy the conditional expression "$(C \times r - n) \times L < T - x$" (step 505).

Here, if the conditional expression is satisfied, the backhitch determination unit 44 acquires Target_Data_Size, Target_Read_Data_Rate, Read_Data_Rate_with_Speed1, Accumulated_Interval, Speed_X, and Speed1 (step 506). Among them, Target_Data_Size, Target_Read_Data_Rate, Read_Data_Rate_with_Speed1, and Speed1 may be acquired from the setting information internally retained in advance. In addition, the values stored in the history storage unit 47 in step 414 may be acquired as Accumulated_Interval and Speed_X.

Then, the backhitch determination unit 44 obtains Threshold by using the formula "Threshold=Target_Data_Size/Target_Read_Data_Rate−Target_Data_Size/Read_Data_Rate_with_Speed1−Accumulated_Interval*Speed_X/Speed1" (step 507), and determines whether or not Threshold is larger than 0 (step 508).

If Threshold is determined to be larger than 0 as a result, a determination result is set to execution of SWBF (step 509).

On the other hand, in each of the case where it is determined that the mode information does not indicate the high data rate mode in step 502, the case where it is determined that the conditional expression "$(C \times r - n) \times L < T - x$" is not satisfied in step 505, and the case where Threshold is determined to be equal to or smaller than 0 in step 508, the determination result is set to execution of backhitch (step 510).

Figure 7:
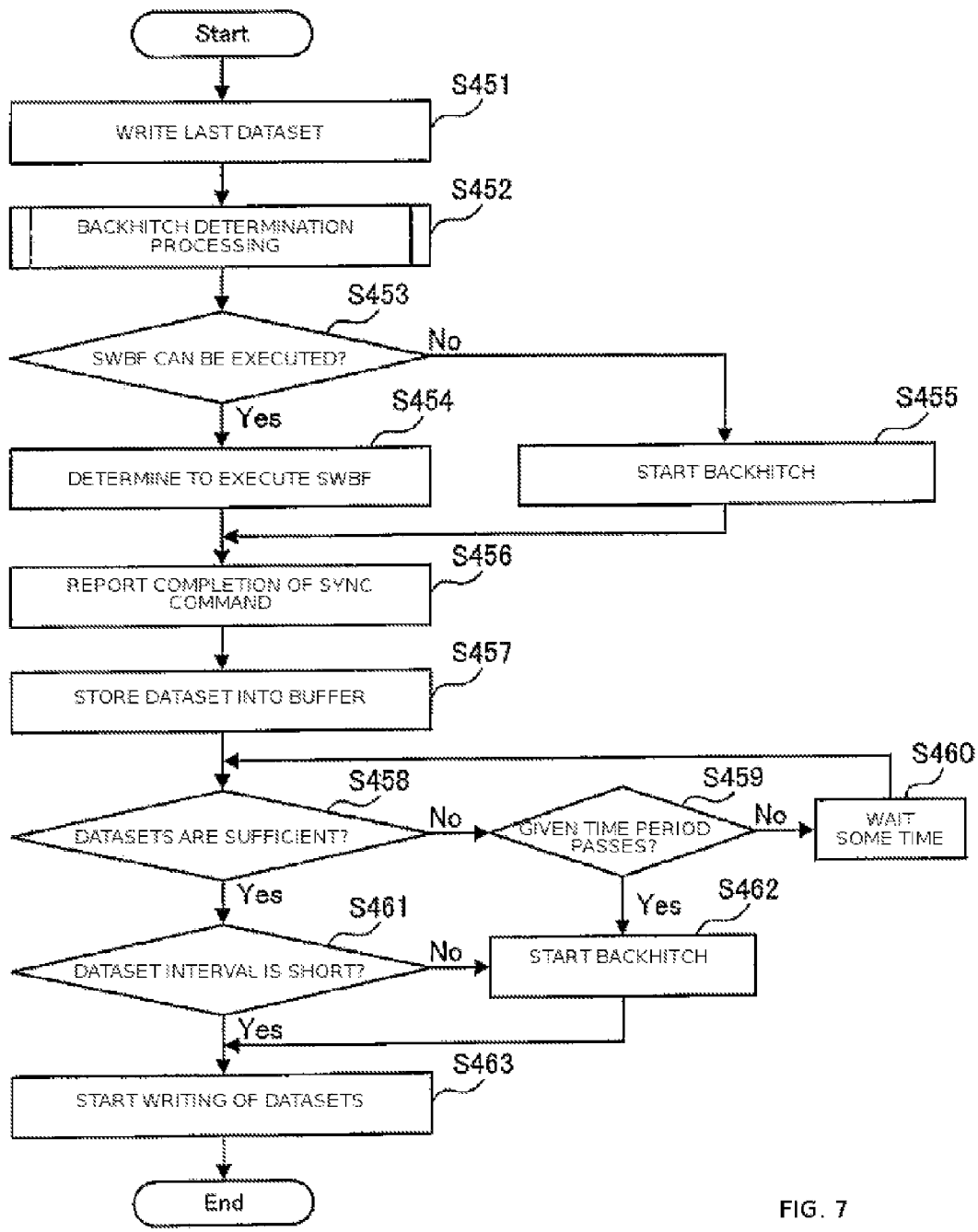
FIG. 7 is a diagram showing a second operation example of the controller according to an embodiment of the invention.

FIG. 7 is a flowchart illustrating a second operation example of the controller 16. This second operation example corresponds to the transaction-size-based control method in the foregoing control for the read data rate. Here, this operation example is assumed to start during writing of datasets in the buffer 12 to the tape 23 in response to a synchronization command.

Here, steps 451 to 463 in the second operation example are the same as steps 401 to 413 in the aforementioned first operation example, and the second operation example is different from the aforementioned first operation example in that the second operation example does not includes a step of acquiring Accumulated_Interval and Speed_X as in step 414.

Next, the details of the backhitch determination processing in step 452 will be described.

Figure 8:
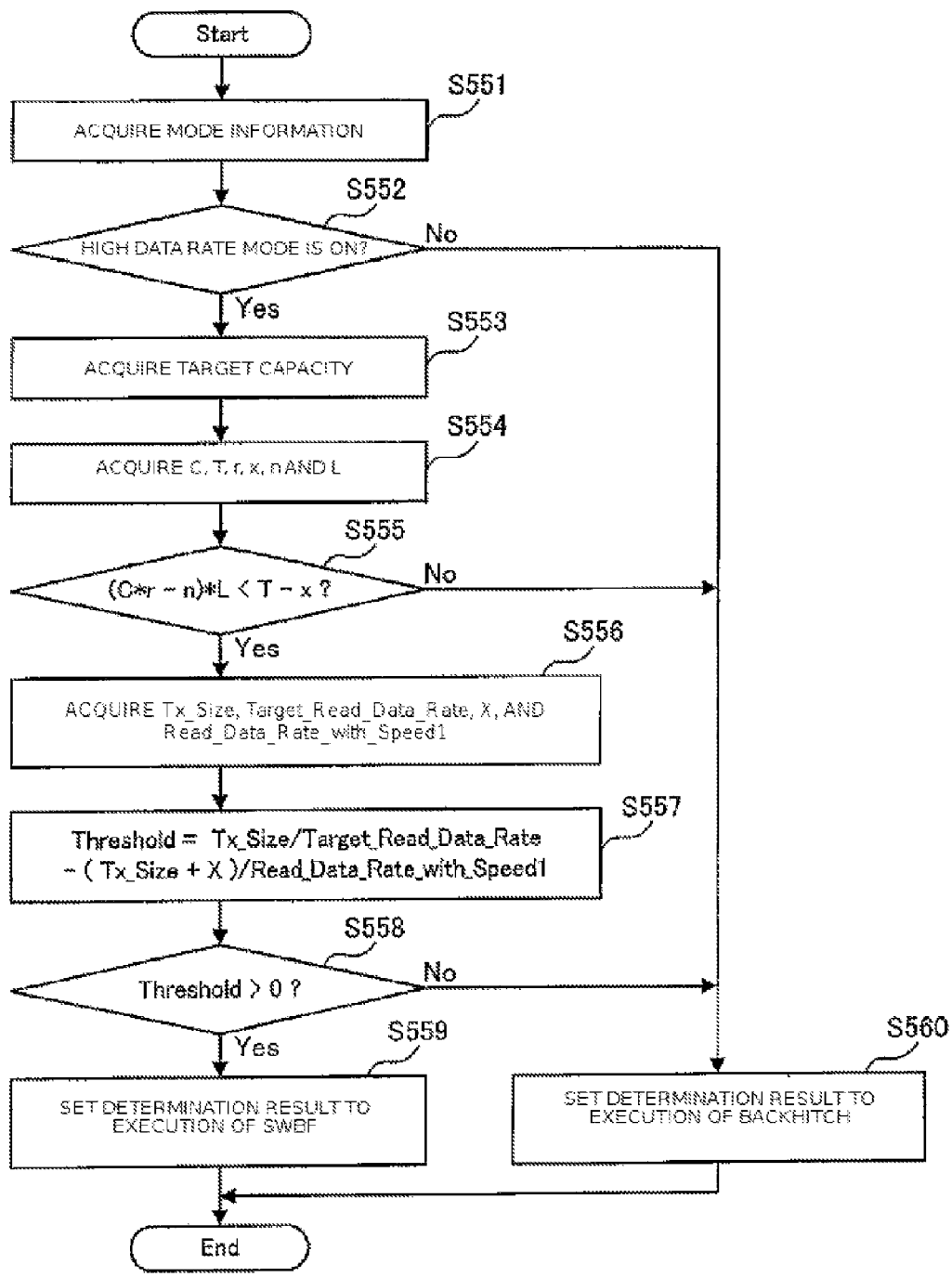
FIG. 8 is a diagram showing a second operation example of the backhitch determination unit of the controller according to an embodiment of the invention.

FIG. 8 is a flowchart illustrating a flow of the backhitch determination processing.

Since steps 551 to 555 in the flow of the backhitch determination processing are the same as steps 501 to 505 in FIG. 6, the detailed description thereof is omitted herein.

When the conditional expression "(C×r−n)×L<T−x" is satisfied in step 555, the backhitch determination unit 44 acquires Tx_Size, Target_Read_Data_Rate, X, and Read_Data_Rate_with_Speed1 (step 556). Among them, since Tx_Size can be obtained when the last dataset is written in step 451, the value may be acquired as Tx_Size. In addition, Target_Read_Data_Rate and Read_Data_Rate_with_Speed1 may be acquired from the setting information internally retained in advance. Further, since X is defined as Read_Data_Rate_with_Speed1*Max_Interval/Tape_Speed, X may be calculated by using the values acquired from the setting information internally retained in advance.

Then, the backhitch determination unit 44 obtains Threshold by using the formula "Threshold=Tx_Size/Target_Read_Data_Rate−(Tx_Size+X)/Read_Data_Rate_with_Speed1," and determines whether or not Threshold is larger than 0 (step 558).

If Threshold is determined to be larger than 0 as a result, a determination result is set to execution of SWBF (step 559).

On the other hand, in each of the case where it is determined that the mode information does not indicate the high data rate mode in step 552, the case where it is determined that the conditional expression "(C×r−n)×L<T−x" is not satisfied in step 555, and the case where Threshold is determined to be equal to or smaller than 0 in step 558, the determination result is set to execution of backhitch (step 560).

Here, description will be provided for selection of the speed of the tape 23.

In the first place, if the speed of the tape 23 is too fast compared with the data rate of the host 30, data transfer cannot be performed efficiently because of occurrence of backhitch. In contrast, if the speed of the tape 23 is too slow compared with the data rate of the host 30, data waiting for writing to the tap 23 are accumulated in the buffer 12, and thereby the practical data rate with the host 30 decreases. For this reason, it is preferable that the data rate of the host 30 and the read data rate from the tape 23 be equal to each other for writing data sent from the host 30 to the tape 23 and for sending data read from the tape 23 to the host 30.

FIG. 9 illustrates an example of correspondence between the read data rate from the tape 23 and the tape speed. The tape speed is expressed as "SpeedX" (X=1, . . . , 5) in the drawing, but may be expressed by using specific values (5.987 m/sec for Speed1, for example). Here, in the drawing, "SpeedX" becomes faster as the value of X becomes smaller.

Under the above condition, consider a case where the data rate of the host 30 is 100 MB/sec, for example. In this case, Speed3 that is the tape speed corresponding to the read data rate of 100 MB/sec is usually considered suitable to transport the tape 23. In the present embodiment, however, intervals are generated between datasets. For this reason, there is a possibility that the read data rate of 100 MB/sec cannot be ensured even if the tape 23 is transported with Speed3. Thus, it is preferable to ensure the read data rate of 100 MB/sec by transporting the tape 23 with Speed2 or Speed1. A suitable tape speed may determined (e.g., Speed1 or Speed2) by interpreting a decrease in the recording density in writing due to SWBF as a decrease in the recording density due to occurrence of errors.

The description of the present embodiment is completed hereinabove.

As described above, in the present embodiment, prepared is the high data rate mode in which a target capacity of data is written to a tape medium, the target capacity calculated by the nominal capacity minus a data capacity lost due to execution of backhitchless writing. Use of this mode enables the target capacity of data out of the nominal capacity to be written to the tape medium.

Note that, although the backhitch is performed prior to a change in the speed of the tape 23 in the present embodiment, an embodiment may be configured to change the speed of the tape 23 without performing backhitch.

Here, the invention may be entirely implemented by hardware, or may be entirely implemented by software. Instead, the invention may be implemented by both of hardware and software. the invention may also be implemented as a computer, a data processing system, and a computer program. This computer program can be stored in a computer-readable medium, and be provided. Here, a medium considered usable as the above medium is an electric, magnetic, optical, electromagnetic, infrared or semiconductor system (apparatus or device), or a propagation medium. In addition, examples of the computer-readable medium include a semiconductor, a solid state storage device, a magnetic tape, a removable computer diskette, a random access memory (RAM), a read-only memory (ROM), a rigid magnetic disc, and an optical disc. Examples of the optical disc at the present time include a compact disc read-only memory (CD-ROM), a compact disc read/write (CD-R/W) and a DVD.

The invention has been described using the example embodiments above. The technical scope of the invention, however, is not limited to the foregoing embodiments. It is apparent to those skilled in the art to modify the foregoing embodiment variously or to employ an alternative embodiment without deviating from the spirit and scope of the invention.

The invention claimed is:

1. An apparatus for writing data to a tape medium, comprising:
   a storage unit that stores mode information indicating a data rate of the apparatus; and
   a determination unit that determines to write a target amount of data to the tape medium responsive to the mode information indicating a particular data rate, wherein the target amount of data is calculated based on a nominal capacity of the tape medium minus a data capacity lost due to a backhitchless data writing.

2. The apparatus according to claim 1, wherein the determination unit executes a backhitch data writing responsive to writing first data to the tape medium and writing second data next to the first data.

3. The apparatus according to claim 2, wherein responsive to a read data rate for the tape medium satisfying a target read rate, the determination unit executes the backhitch data writing after writing both the first data and the second data to the tape medium.

4. The apparatus according to claim 3, wherein the determination unit determines that the read data rate for the tape medium satisfies the target read rate when time required to read unit data from the tape medium and skip an area on the tape medium where no data is written is less than time required to read the unit data at the target read rate.

5. The apparatus according to claim 3, wherein the determination unit determines that the read data rate for the tape medium satisfies the target read rate when time required to read unit data from the tape medium and an area on the tape because the tape medium is transported without execution of backhitch is less than time required to read the unit data at the target read rate.

6. The apparatus according to claim 1, further comprising a host configured to receive a command from an application program to write data to the tape medium, wherein responsive to loading of a tape cartridge containing the tape medium, the storage unit stores the mode information according to the command from the application program.

7. The apparatus according to claim 1, wherein responsive to loading of a particular tape cartridge containing the tape medium, the storage unit stores the mode information indicating the particular mode.

8. An apparatus of controlling data writing to a tape medium, comprising:
   a storage unit that stores mode information indicating a data rate of the apparatus; and
   a determination unit that determines to write a target amount of data to the tape medium without executing backhitch after writing first data to the tape medium until writing second data next to the first data, wherein the mode information indicates a particular data rate, a read data rate for the tape medium satisfies a target read rate, and the target amount of data is calculated based on a nominal capacity of the tape medium minus a data capacity lost due to a backhitchless data writing.

9. A method of writing data to a tape medium, comprising:
   storing mode information indicating a data rate of the apparatus in a memory; and
   writing a target amount of data to the tape medium responsive to the mode information indicating a particular data rate, wherein the target amount of data is calculated based on a nominal capacity of the tape medium minus a data capacity lost due to a backhitchless data writing.

10. The method according to claim 9, wherein the determination unit executes a backhitch data writing responsive to writing first data to the tape medium and writing second data next to the first data.

11. The method according to claim 10, wherein responsive to a read data rate for the tape medium satisfying a target read rate, the determination unit executes the backhitch data writing after writing both the first data and the second data to the tape medium.

12. The method according to claim 11, wherein the determination unit determines that the read data rate for the tape medium satisfies the target read rate when time required to read unit data from the tape medium and skip an area on the tape medium where no data is written is less than time required to read the unit data at the target read rate.

13. The method according to claim 11, wherein the determination unit determines that the read data rate for the tape medium satisfies the target read rate when time required to read unit data from the tape medium and an area on the tape because the tape medium is transported without execution of backhitch is less than time required to read the unit data at the target read rate.

14. The method according to claim 9, further comprising receiving at a host a command from an application program to write data to the tape medium, wherein responsive to loading of a tape cartridge containing the tape medium, the storage unit stores the mode information according to the command from the application program.

15. The method according to claim 9, wherein responsive to loading of a particular tape cartridge containing the tape medium, the storage unit stores the mode information indicating the particular mode.

16. A computer program product for writing data to a tape medium, the computer program product comprising computer program embodied on a non-transitory data storage medium and configured to cause a tape storage system to:
   store mode information indicating a data rate mode of the system in a memory; and
   determine to write a target amount of data to the tape medium when the mode information indicates a particular data rate, and the target amount of data is calculated based on a nominal capacity of the tape medium minus a data capacity lost due to a backhitchless data writing.

17. The computer program product according to claim 16, wherein the determination unit executes a backhitch data writing responsive to writing first data to the tape medium and writing second data next to the first data.

18. The computer program product according to claim 17, wherein responsive to a read data rate for the tape medium satisfying a target read rate, the determination unit executes the backhitch data writing after writing both the first data and the second data to the tape medium.

19. The computer program product according to claim 18, wherein the determination unit determines that the read data rate for the tape medium satisfies the target read rate when time required to read unit data from the tape medium and skip an area on the tape medium where no data is written is less than time required to read the unit data at the target read rate.

20. The computer program product according to claim 18, wherein the determination unit determines that the read data rate for the tape medium satisfies the target read rate when time required to read unit data from the tape medium and an area on the tape because the tape medium is transported without execution of backhitch is less than time required to read the unit data at the target read rate.

* * * * *